(12) United States Patent
Tadokoro

(10) Patent No.: US 6,488,053 B1
(45) Date of Patent: Dec. 3, 2002

(54) CORRUGATED TUBE

(75) Inventor: Shinichi Tadokoro, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/166,005

(22) Filed: Jun. 11, 2002

(30) Foreign Application Priority Data

Jun. 12, 2001 (JP) ........................................ 2001-177415

(51) Int. Cl.$^7$ ................................................ F16L 11/00
(52) U.S. Cl. ...................... 138/156; 138/110; 138/128; 138/121; 174/92
(58) Field of Search ................................ 138/156, 110, 138/121, 163, 162, 166–168, 128, 108; 174/92, 135

(56) References Cited

U.S. PATENT DOCUMENTS

| | | | | |
|---|---|---|---|---|
| 578,800 A | * | 3/1897 | Wilmot | 138/156 |
| 578,801 A | * | 3/1897 | Wilmot | 138/156 |
| 3,583,424 A | * | 6/1971 | Bryant | 138/121 |
| 4,442,154 A | * | 4/1984 | Fortsch et al. | 138/156 |
| 4,442,155 A | * | 4/1984 | Foertsch et al. | 138/156 |
| 4,517,234 A | * | 5/1985 | Fisher | 138/156 |
| 4,940,614 A | * | 7/1990 | Kastl et al. | 138/118.1 |
| 5,727,599 A | * | 3/1998 | Fisher et al. | 138/110 |
| 5,947,159 A | * | 9/1999 | Takahashi | 138/128 |
| 6,079,451 A | * | 6/2000 | Hegler | 138/110 |

FOREIGN PATENT DOCUMENTS

JP   2000-134762   5/2000

* cited by examiner

*Primary Examiner*—Patrick Brinson
(74) *Attorney, Agent, or Firm*—Sughrue Mion, PLLC

(57) ABSTRACT

In a corrugated tube, a tubular body is provided with a first slit which extends in an axial direction of the tubular body, and the tubular body is formed with a plurality of hollow ridge portions extending in a circumferntial direction of the tubular body on an outer peripheral face of the tubular body to form a bellows portion. A lap portion is protruded from at least one of opposed end portions of the tubular body separated by the first slit, and the lap portion extends along the first slit. The lap portion is provided with a second slit which extends in the circumferential direction of the tubular body.

2 Claims, 6 Drawing Sheets

CORRUGATED TUBE

BACKGROUND OF THE INVENTION

This invention relates to a corrugated tube for fitting on a wire harness (a bundle of wires) or the like, and more particularly to a corrugated tube of the overlapping type in which a lap portion, formed in a projected manner at one of opposed side edges of a slit formed in the corrugated tube along an axis thereof, is laid on an inner peripheral face of the other side edge portion, Generally, in a corrugated tube used for bundling and protecting transmission/distribution wires of an electronic equipment, a wire harness of an automobile or others, spiral or annular ridge portions are formed continuously on an outer peripheral face of a resin tube to form a bellows-like construction, thereby imparting bendability to the corrugated tube.

In order that a wire harness or the like can be easily inserted into and removed from the corrugated tube for protecting the wire harness, a slit is formed in the corrugated tube, and extends along the axis thereof.

However, when such a corrugated tube is bent along an installation path, the slit is partially opened in the vicinity of a central portion of the bent portion, and the inserted wire harness or be like projects outwardly through the opened portion of the slit, thus adversely affecting the inserting operation, and besides there is a fear that the wire harness is caught by the opposed side edges of the slit, so that an insulating sheath of the wire harness is damaged.

Therefore, usually, an insulating tape is wound on the outer peripheral face of the corrugated tube, thereby preventing the slit from being opened. However, there has been encountered a problem that this tape-winding operation requires much time and labor.

In order to solve the above problems with the corrugated tube, there have been proposed various corrugated tubes of the overlapping type in which a slit will not be opened to form an opened portion even when the corrugated tube is bent.

In a corrugated tube 1 of the overlapping type shown in FIGS. 7 and 8, a plate-like lap portion 8, formed in a projected manner at one of opposed side edges of a slit 5 formed along an axis of a tube body 3, is laid on (laps over) an inner peripheral face of the other side edge portion of the slit 5 so that a wire harness W will not be exposed to outside even when the corrugated tube is bent A tape-winding operation is not necessary.

In the corrugated tube 1, the lap portion 8, laid on the inner peripheral face of the other side edge portion of the slit, has a distal end edge extending straight in the axial direction.

Therefore, when inserting the wire harness W into the corrugated tube after expanding the slit 5, the wire harness W is less liable to be caught by the distal end edge of the lap portion 8, and the harness-inserting operation can be effected smoothly. And besides, there is no fear that the distal end edge of the lap portion 8, laid on the inner peripheral face of the corrugated tube 1, damages an insulating sheath of the inserted wire harness W.

For forming the above corrugated tube 1, first, a tube-like molten resin is extruded from a die into a tubular mold having a predetermined molding face formed on an inner peripheral face thereof, and either by applying pressurized air to the inside of this tube or by applying vacuum to the outer side of this tube, ridge and grooves, formed at the molding fate, are transferred to the tube-like molten resin, thereby continuously forming a long tube body 3.

The tube body 3, molded into an integral construction, includes a plate-like portion 7, extending along the axis thereof, and a bellows portion 9 having a series of arcuate ridge portions 10 which are formed in a bulged manner on an outer peripheral face of the tube body 3 except the plate-like portion 7, and are arranged along the axis of the tube body 23.

Then, the straight slit 5 is formed in the plate-like portion 7 along the axis of the tube body, so that the plate-like lap portion 8 is formed at one of the opposed side edges of the slit 5 in a projected manner.

Then, the corrugated tube 1 is formed by heat into such a shape that the lap portion 8 laps on the inner peripheral face of the other side edge portion of the slit 5, thereby forming the corrugated tube 1 of the overlapping type as shown in FIG. 9.

In the above corrugated tube 1, however, the lap portion 8 is formed into a plate-like shape, and besides end walls 12 and 14 are formed respectively at circumferential end portions of each ridge portion 10 opposed to each other with the slit 5 lying therebetween.

When bending the corrugated tube 1 along an installation path, the lap portion 8, which is formed into the plate-like shape, can not be easily bent, and the corrugated tube I itself can not be easily bent and therefore there has been encountered a problem that the installation operation can be adversely affected.

Particularly when the corrugated tube 1 is bent in such a manner that the lap portion 8 is curved inwardly (curved convexly downwardly as shown in FIGS. 10A and 10B), the lap portion 8, together with the end walls 12 and 14 (which are parallel to the bending direction, and have high rigidity), provides a resistance to the bending, and therefore the flexibility of the corrugated tube 1 is not good.

In the corrugated tube 1 of the overlapping type in which the lap portion 8 is laid on the inner peripheral face of the other side edge portion of the slit, when the wire harness W is to be inserted into this corrugated tube after expanding the slit 5, the slit 5 must be opened wide while displacing the lap portion 8, and therefore there has been encountered a problem that the operation for inserting the wire harness W requires much time and labor.

SUMMARY OF THE INVENTION

It is therefore an object of this invention to provide a corrugated tube in which a flexibility can be enhanced though having a lap portion, and a wire harness or the like can be easily received therein.

In order to achieve the above object, according to the present invention, there is provided a corrugated tube comprising:

a tubular body, provided with a first slit which extends in an axial direction of the tubular body, and the tubular body formed with a plurality of hollow ridge portions extending in a circumferential direction of the tubular body on an outer peripheral face of the tubular body to form a bellows portion, and a lap portion, protruded from at least one of opposed end portions of the tubular body separated by the first slit the lap portion extending along the first slit;

wherein, the lap portion is provided with a second slit which extends in the circumferential direction of the tubular body.

In this construction, the lap portion comprises a plurality of juxtaposed lap piece portions which are separated from one another by the second slits, and therefore the lap portion is reduced flexural rigidity in the axial direction, and can be easily deformed with a stress in a bending direction.

Therefore, the lap portion of the tubular body will not provide a large resistance to the bending of the corrugated tube, and the flexibility of the corrugated tube is enhanced.

The lap piece portions can be flexed more easily as compared with the related lap portion, extending in the axial direction, and these lap piece portions can be flexed independently of one another.

Therefore, when inserting a wire harness or the like into the corrugated tube after expanding the slit, the harness-inserting operation can be effected smoothly.

Preferably, the second slit is extended toward and on the ridge portion.

In this construction, the end portions of the ridge portions cut by the second slit are reduced in rigidity, and therefore can be easily deformed with a stress in the axial direction.

When the tubular body is bent, relieve from bent can be secured also at the end portions of the ridge portions, and the flexibility of the corrugated tube, having the lap portion, can be further enhanced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

One preferred embodiment of a corrugated tube according to the present invention will now be described below in detail with reference to the accompanying drawings.

Figure 1:
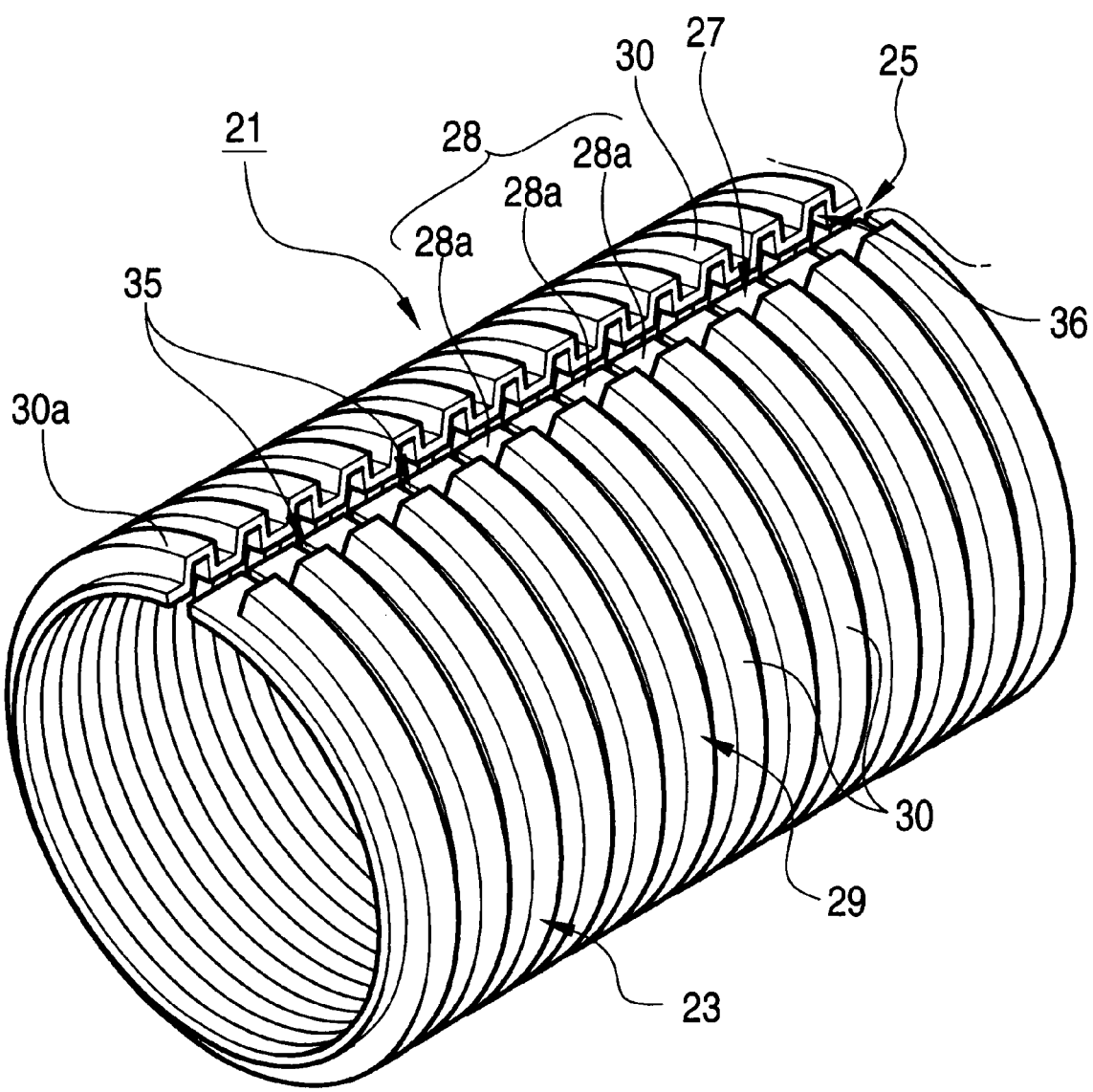
FIG. 1 is a perspective view of a portion of a first embodiment of a corrugated tube according to the present invention.
Figure 2:
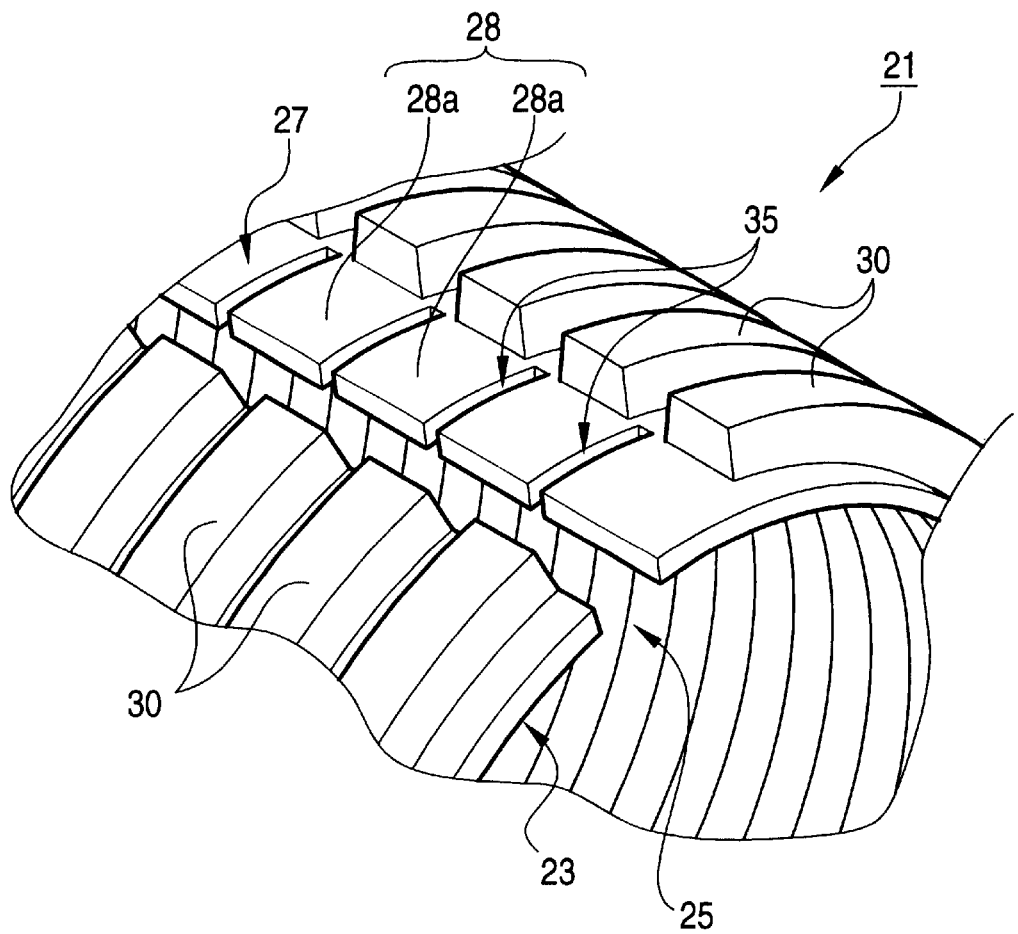
FIG. 2 is an enlarged, perspective view of an important portion of the corrugated tube of FIG. 1.
Figure 3:
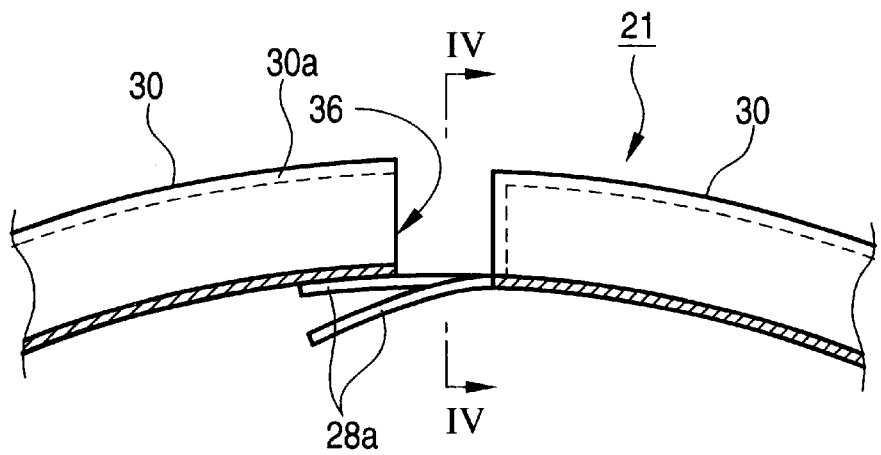
FIG. 3 is an enlarged, transverse cross-sectional view of an important portion of the corrugated tube of FIG. 1.

As shown in FIGS. 1 to 3, in the corrugated tube 21 of this first embodiment, a plate-like lap portion 28, formed in a projected manner at one of opposed side edges of a slit 25 formed along an axis of a tube body 23, laps over an inner peripheral face of the other side edge portion of the slit 25 so that a wire harness will not be exposed to an- outside even when the corrugated tube is bent.

As shown in FIG. 1, the tube body 23 includes a plate-like portion 27, extending along the axis thereof, and a bellows portion 29 having a series of arcuate ridge portions 30 which are formed in a bulged manner on an outer peripheral face of the tube body 23 except the plate-like portion 27, and are arranged along the axis of the tube body 23. This tube body 23 is molded into an integral construction, and then the slit 25 is formed in the plate-like portion 27 along the axis of the tube body, so that the plate-like lap portion 28 is formed at one of the opposed side edges of the slit 25 in a projected manner.

The corrugated tube 21, shown in FIGS. 1 and 2, is in a condition before the tube body 23 is formed by heat into such a shape that the lap portion 28 laps on the inner peripheral face of the other side edge portion of the slit 25. In the final form of the corrugated tube, the lap portion 28 is laid on the inner peripheral face of the other side edge portion of the slit 25, as shown in FIG. 3.

A plurality of cutting slits 35, extending in the direction of the periphery of the tube body 23, are formed in the lap portion 28, and therefore the lap portion 28 comprises a plurality of lap piece portions 28a which are spaced from one another by the cutting slits 35, and are juxtaposed to one another in the axial direction.

In the corrugated tube 21 of this embodiment one (left end wall in FIG. 3) of end walls of each ridge portion 30 (formed respectively at circumferential end portions thereof, opposed to each other with the slit 25 lying therebetween, is cut or removed to form an opening 36.

Figure 4A:
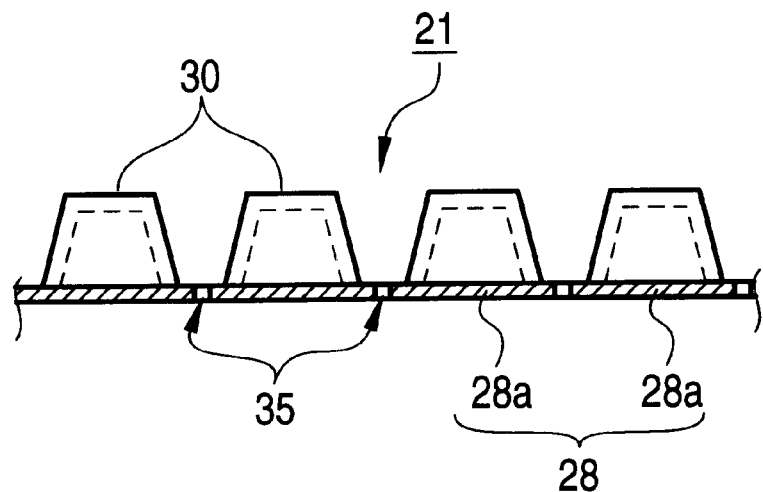
FIGS. 4A is a cross-sectional view of the corrugated tube in a straight condition taken along the line IV—IV of FIG. 3.
Figure 4B:
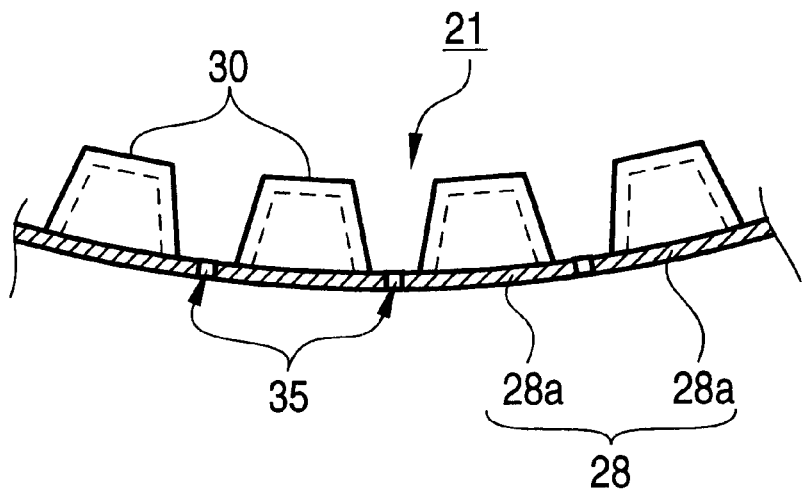
FIG. 4B is a cross-sectional view of the corrugated tube in a bent condition taken along the line IV—IV of FIG. 3.

In the corrugated tube 21 of this first embodiment even when this corrugated tube 21 is bent in such a manner that the lap portion 28 is curved inwardly (curved convexly downwardly as shown in FIGS. 4A and 4B), the lap portion 28, comprising the plurality of juxtaposed lap piece portions 28a spaced from one another by the cutting slits 35, can be easily deformed with a stress in the bending direction since this lap portion 28 has low flexural rigidity in the axial direction.

Namely, when the corrugated tube 21 is bent, the lap portion 28 of the tube body 23 will not provide a large resistance to this bending action, and the flexibility of the corrugated tube 21 is enhanced.

And besides, the peripheral end walls of the ridge portions 30, disposed at the other side edge portion of the slit 25 (on which the lap portion 28 is laid at the Inner periphery of the tube body) are cut or removed to form the respective openings 36, as shown in FIGS. 1 and 3, and therefore top walls 30a and others can be easily deformed with a stress in the direction of the width of the ridge portions 30.

Namely, since these end walls, which are parallel to the bending direction and have high rigidity, are removed, the. circumferential end portion of the ridge portions 30 are reduced in rigidity, and therefore can be easily deformed. Therefore, because of the synergism of this construction and the lap portion 28, comprising the plurality of lap piece portions 28a, the flexibility of the corrugated tube 21 of this first embodiment is further enhanced.

The lap portion 28a, comprising the plurality of lap piece portions 28a, can be flexed more easily as compared with the related lap portion 8 extending in the axial direction, and the lap piece portions 28a can be flexed independently of one another.

Therefore, when inserting a wire harness or the like into the corrugated tube 21 after expanding the slit 25, only the lap piece portions 28a, disposed at that portion of the corrugated tube into which the wire harness or the like is to be sequentially inserted, are flexed independently, and the other lap piece portions 28a do not need to be flexed, and therefore the required harness-inserting force is small, and the harness-inserting operation can be effected smoothly.

Namely, in the corrugated tube 21 of the overlapping type, the lap portion 28 has the plate-like shape, and its distal end edge extends straight in the axial direction.

Therefore, when inserting the wire harness (not shown) or the like after expanding the slit 25, the wire harness is less liable to be caught by the distal end edge of the lap portion 28 (that is, the distal end edges of the lap piece portions 28a), and therefore the harness-inserting operation can be carried out smoothly. And besides, there is no fear that the distal end edges of the lap piece portions 28a, laid on the inner peripheral face of the corrugated tube 21, damage an insulating sheath of the inserted wire harness. Furthermore, there is no need to effect a tape-winding operation for preventing the opening of the slit 25.

And besides, when the corrugated tube 21 is to be bent along an installation path, the corrugated tube 21 itself can be easily bent and the installing operation can be effected easily.

In the above embodiment, although each of the cutting slits 35, formed in the tube body 23 and extending in the direction of the periphery of this tube body, is disposed in a plane between the corresponding adjacent ridge portions 30, the present invention is not limited to this construction, and the positions of formation of the cutting slits, the number and length of the cutting slits and so on can be suitably modified within the scope of the invention.

Figure 5:
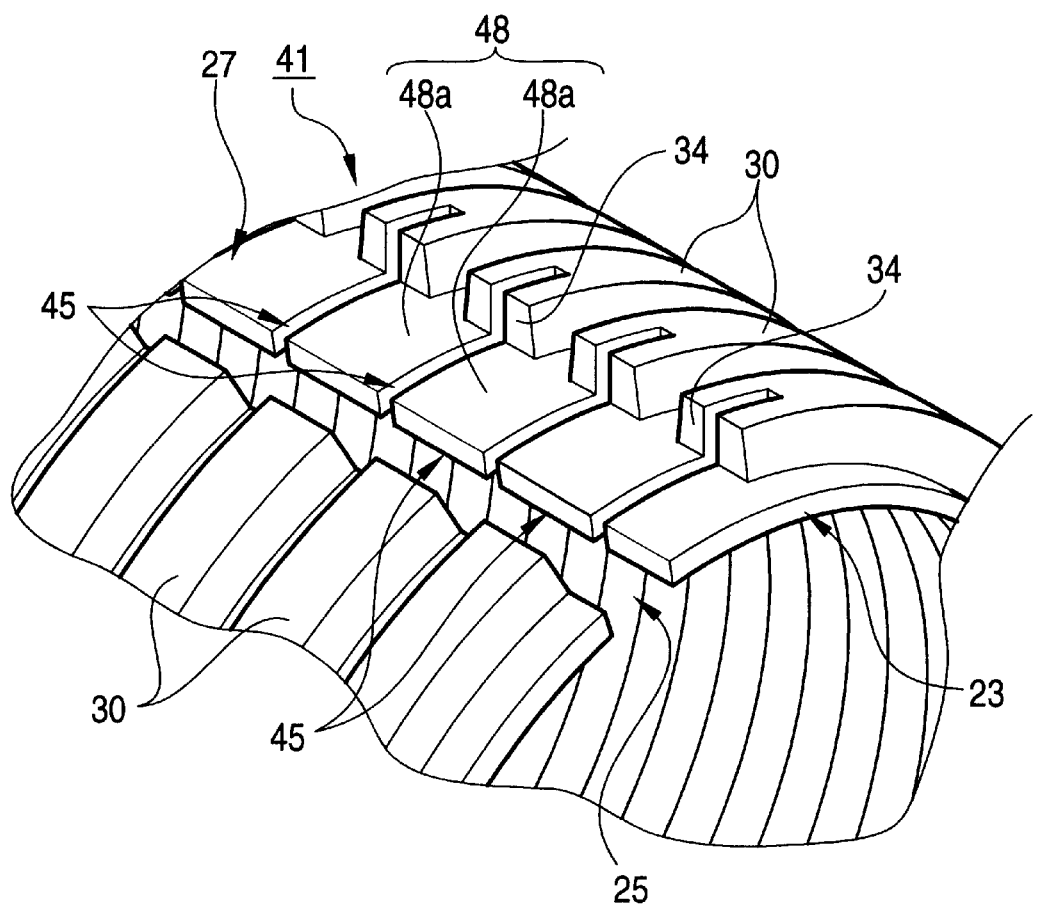
FIG. 5 is an enlarged, perspective view of an important portion of a second embodiment of a corrugated tube according to the invention.
Figure 6:
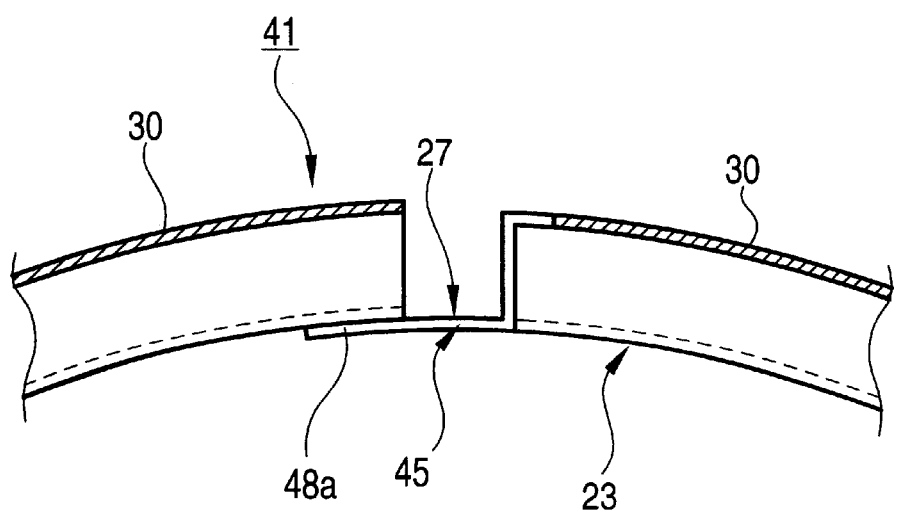
FIG. 6 is an enlarged, transverse cross-sectional view of an important portion of the corrugated tube of FIG. 5.
Figure 7:
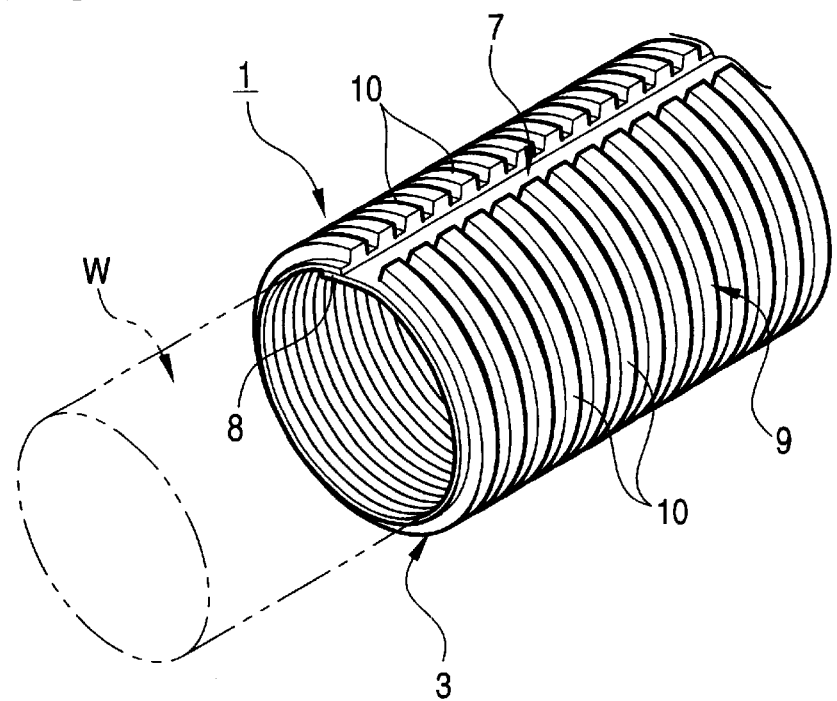
FIG. 7 is a perspective view of a portion of a related corrugated tube, showing a condition in which it is used.
Figure 8:
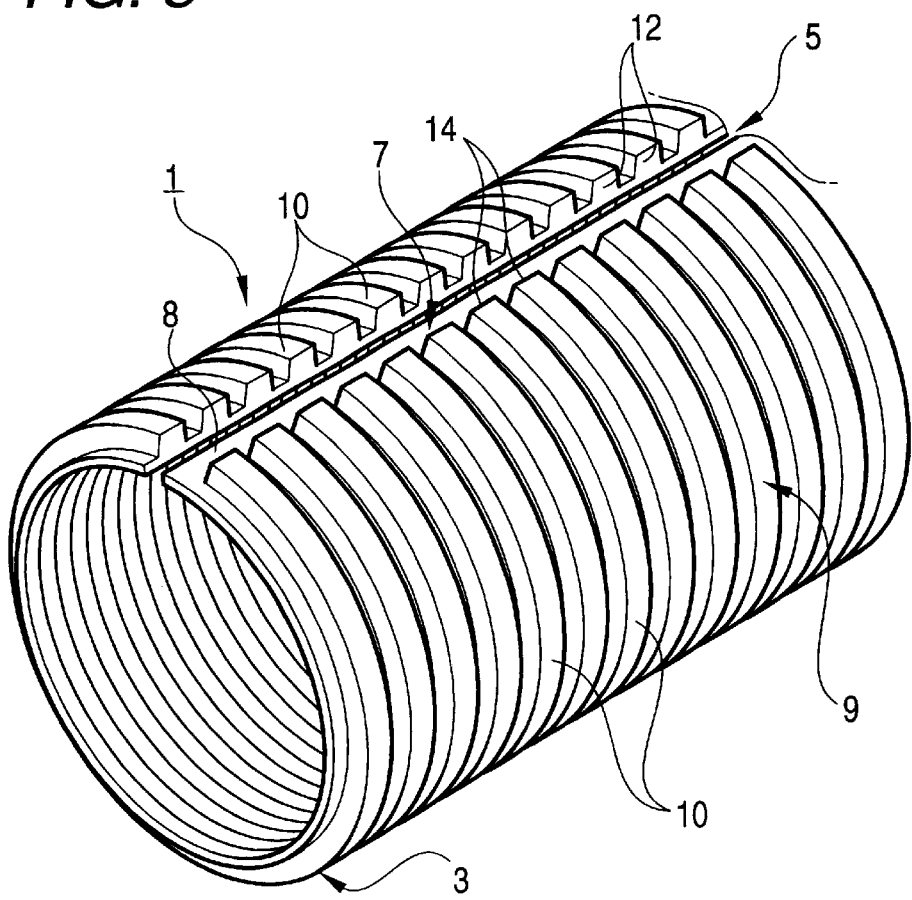
FIG. 8 is a perspective view of a portion of the corrugated tube of FIG. 7.
Figure 9:
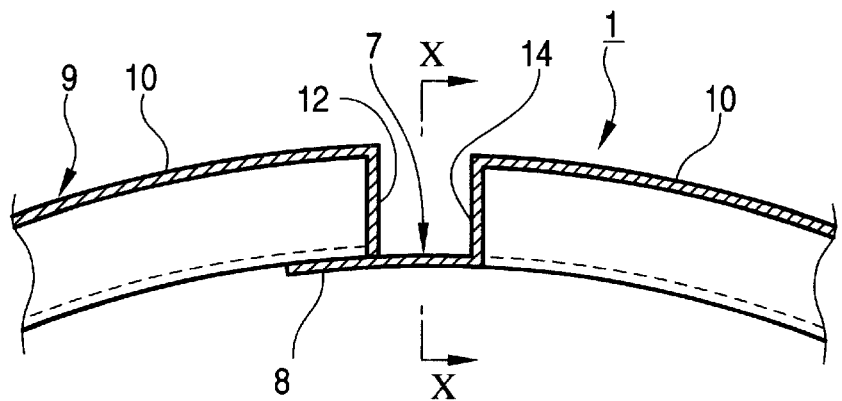
FIG. 9 is an enlarged, transverse cross-sectional view of an important portion of the corrugated tube of FIG. 7.
Figure 10A:
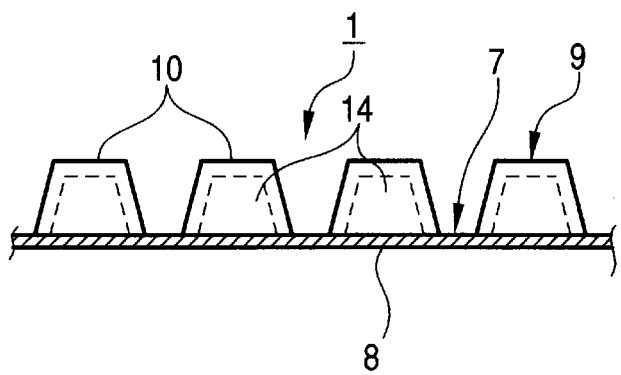
FIGS. 10A is cross-sectional view of the corrugated tube in a straight condition taken along the line X—X of FIG. 9.
Figure 10B:
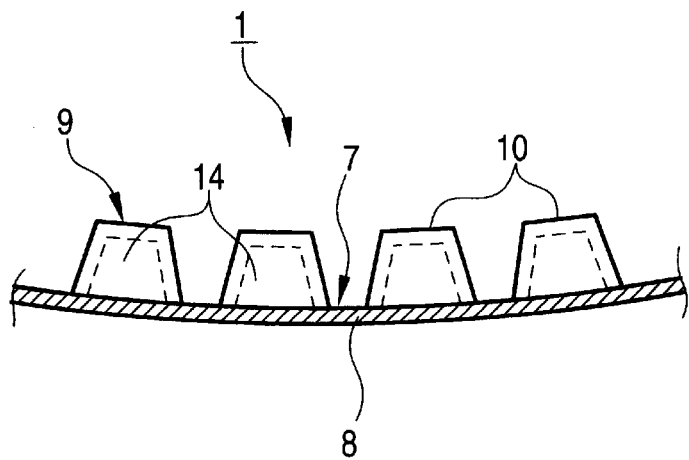
FIG. 10B is cross-sectional view of the corrugated tube in a bent condition taken along the line X—X of FIG. 9.

FIGS. 5 and 6 are an enlarged, perspective view of an important portion of a second embodiment of a corrugated tube 41 according to the invention and a fragmentary, transverse cross-sectional view thereof, respectively.

The corrugated tube 41 of this embodiment is similar in construction to the corrugated tube 21 of the first embodiment except that the positions of a plurality of cutting slits 45, formed in a lap portion 48 (extending along an axis of a tube body 23) and extending in the direction of the periphery of the tube body, are different from those of the first embodiment, as shown in FIG. 5.

Namely, in the corrugated tube 41 of this embodiment, the cutting slits 45, formed in the lap portion 48 (extending along the axis of the tube body 23) and extending in the direction of the periphery of this tube body, are disposed in corresponding relation to ridge portions 30, respectively, and extend respectively into end walls 34 formed respectively at circumferential end portion of the ridge portions 30, as shown in FIGS. 5 and 6.

In the corrugated tube 41 of this second embodiment, the lap portion 48, comprising a plurality of juxtaposed lap piece portions 48a spaced from one another by the cutting slits 45, can be easily bent with a stress in a bending direction, And besides, the circumferential end portion of the ridge portions 30, each having the end wall 34 cut by the cutting slit 45, are reduced in rigidity, and therefore can be easily deformed with a stress in the direction of the width of the ridge portions 30.

When the tube body 23 is bent, relieves from bent of the lap portion 48 can be secured also at the cut circumferential end portion of the ridge portions 30, and the flexibility of the corrugated tube 41, having the plate-like lap portion 48, can be further enhanced.

In the corrugated tubes of the present invention, the constructions of the ridge portions, the lap portion and so on are not limited to those described in the above embodiments, but various modifications can be made within the scope of the invention.

What is claimed is:

1. A corrugated tube, comprising:
   a tubular body, provided with a first slit which extends in an axial direction of the tubular body, and the tubular body formed with a plurality of hollow ridge portions extending in a circumferential direction of the tubular body on an outer peripheral face of the tubular body to form a bellows portion, and
   a lap portion, protruded from at least one of opposed end portions of the tubular body separated by the first slit the lap portion extending along the first slit;
   wherein, the lap portion is provided with a second slit which extends in the circumferential direction of the tubular body.

2. The corrugated tube as set forth in claim 1, wherein the second slit is extended toward and on the ridge portion.

* * * * *